US006951168B1

(12) United States Patent
Tasakos

(10) Patent No.: US 6,951,168 B1
(45) Date of Patent: Oct. 4, 2005

(54) VEGETABLE DELIVERY DEVICE FOR VEGETABLE CUTTING APPARATUS

(76) Inventor: Gary Tasakos, 74619 Magic Garden La., Irrigon, OR (US) 97844

( * ) Notice: Subject to any disclaimer, the term of this patent is extended or adjusted under 35 U.S.C. 154(b) by 0 days.

(21) Appl. No.: 10/837,332

(22) Filed: Apr. 30, 2004

(51) Int. Cl.[7] .......................... A23N 1/00; A23N 15/00
(52) U.S. Cl. ............................ 99/514; 99/546; 99/548; 99/549; 99/584; 99/636; 99/643
(58) Field of Search .......................... 99/516, 534–536, 99/537–541, 584–593, 635–643, 594–599; 198/384, 375, 377, 378

(56) References Cited

U.S. PATENT DOCUMENTS

| | | | | | |
|---|---|---|---|---|---|
| 2,494,914 | A | | 1/1950 | Urschel | 99/491 |
| 2,571,531 | A | * | 10/1951 | Bridge | 99/636 |
| 2,748,818 | A | * | 6/1956 | Peel | 99/514 |
| 3,040,793 | A | * | 6/1962 | Anderson et al. | 99/584 |
| 3,163,282 | A | * | 12/1964 | Shropshire et al. | 198/384 |
| 3,320,988 | A | * | 5/1967 | Armstrong et al. | 99/546 |
| 3,623,524 | A | * | 11/1971 | Buck | 99/516 |
| 3,907,101 | A | * | 9/1975 | Tomelleri | 198/375 |
| 4,112,838 | A | * | 9/1978 | Altman et al. | 99/546 |
| 4,476,778 | A | * | 10/1984 | Clyma | 99/516 |
| 4,759,938 | A | * | 7/1988 | Rohm | 426/481 |
| 5,000,087 | A | | 3/1991 | Nagaoka | 99/636 |

* cited by examiner

*Primary Examiner*—Timothy F. Simone
(74) *Attorney, Agent, or Firm*—Floyd E. Ivey; Liebler, Ivey, Connor, Berry & St. Hilaire

(57) ABSTRACT

The present invention discloses a vegetable delivery device for use in trimming roots and tops from bulbs such as onions. The device comprises a frame, a bottom conveyance means and a top conveyance means composed of a chain and gear system with a common synchronized drive. Concave cups are synchronously positioned in opposition to grasp and secure a vegetable as the conveyance means passes the vegetable to, through and past a cutting means. A wheel or skid means exerts a downward force against the top conveyance means proximal the cutting means as an additional manner of securing the vegetable as it passes the cutting means.

2 Claims, 7 Drawing Sheets

VEGETABLE DELIVERY DEVICE FOR VEGETABLE CUTTING APPARATUS

FIELD OF THE INVENTION

The present invention relates generally to an improved apparatus and method for the delivery of bulbs or vegetables to a cutting device for the removal of the stem and root of a bulb or vegetable. The invention is particularly related to the stabilization of a bulb or vegetable as it is engaged by cutting means. The improved delivery device is accommodates bulbs and vegetables of many sizes. The term "bulb" as used herein means any bulbous part of a plant or the like including but not limited to an onion, a garlic, a beet, a scallion, a shallot, and other root and fruit crops.

BACKGROUND OF THE INVENTION

Many cuttings machines for the removal of tops, tails, stems and roots deliver the subject bulbs or vegetables to a cutting means via mechanical devices which puncture the bulb or which fail to provide stability to the bulb as it encounters the cutting means. The "whole peel" onion processing requires the outer layer(s) of skin to be removed along with the stem and root ends with minimal marks on the onion. This has long been done by hand to ensure minimal markup of the onion.

There are a number of onion cutting machines that remove the stems and roots from onions. However, these machines do not stabilize the position of the bulb or onion as presented herein. Typically the known bulb or onion positioning and stabilizing mechanisms are complex and require considerable maintenance. U.S. Pat. No. 5,000,087 to Nagaoka discloses a pair of side clamps which secure the bulb; U.S. Pat. No. 2,494,914 to Urschel et al discloses a cradle and spike which secure the bulb.

The patents referred to herein are provided herewith in an Information Disclosure Statement in accordance with 37 CFR 1.97.

SUMMARY OF THE INVENTION

The present invention discloses a positioning, stabilizing and delivery mechanism (1) to secure objects, bulbs, vegetables and such items (17) through a cutting means (10) for the removal of a portion of the object (17), including tops and tails for onions. The invention is positioned by frame means (14) and conveys objects (17) along the frame means (14) to, through and past cutting means (10). At least one first cup (56) is affixed by cup affixing means (48) to a bottom conveyance means (50); at least one second cup (57) is affixed by cup affixing means (48) to a top conveyance means (51); the bottom conveyance means (50) and the top conveyance means (51) are comprised, in the preferred embodiment, of a continuous loop chain or belt (50), (51). The respective bottom conveyance means (50) with at least one first cup (56) and top conveyance means (51) with at least one second cup (57) are positioned to place the at least one first cup (56) and the at least one second cup (57) in opposition to each other and to receive and stabilize a bulb (17) as it encounters, is cut and passes cutting means (10). The bulb (17) following the cutting is discharges into a container or onto a conveyor for process purposes. A wheel or skid means (90) is proximal to and bears downwardly on the top conveyance means (51) proximal the cutting means (10) to insure that the bulb (17) is retained securely between the at least one first cup (56) and the at least one second cup (57) as the cutting occurs. The at least one first cup (56) and at least one second cup (57) are synchronized by synchronizing means (53) provided, for example, by drive means (18) gear and chain or belt and pulley drive interrelating of the bottom conveyance means (50) and the top conveyance means (51).

BRIEF DESCRIPTION OF THE DRAWINGS

The foregoing and other features and advantages of the present invention will become more readily appreciated as the same become better understood by reference to the following detailed description of the preferred embodiment of the invention when taken in conjunction with the accompanying drawings, wherein.

DETAILED DESCRIPTION OF THE PREFERRED EMBODIMENT(S)

Figure 1:
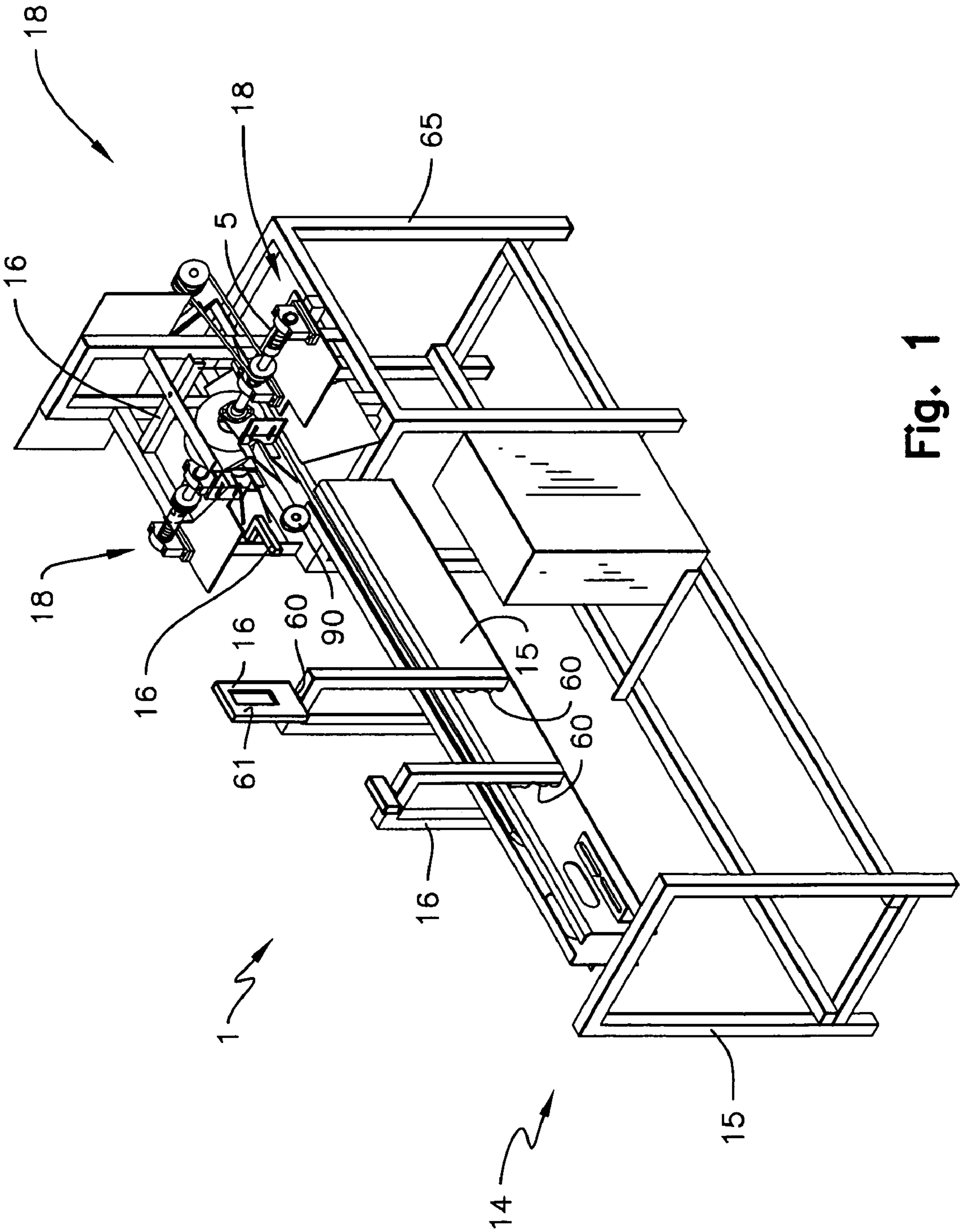
FIG. 1 illustrates a frame means (14) for use with a Vegetable Delivery is discharges into a container Device (1).
Figure 2:
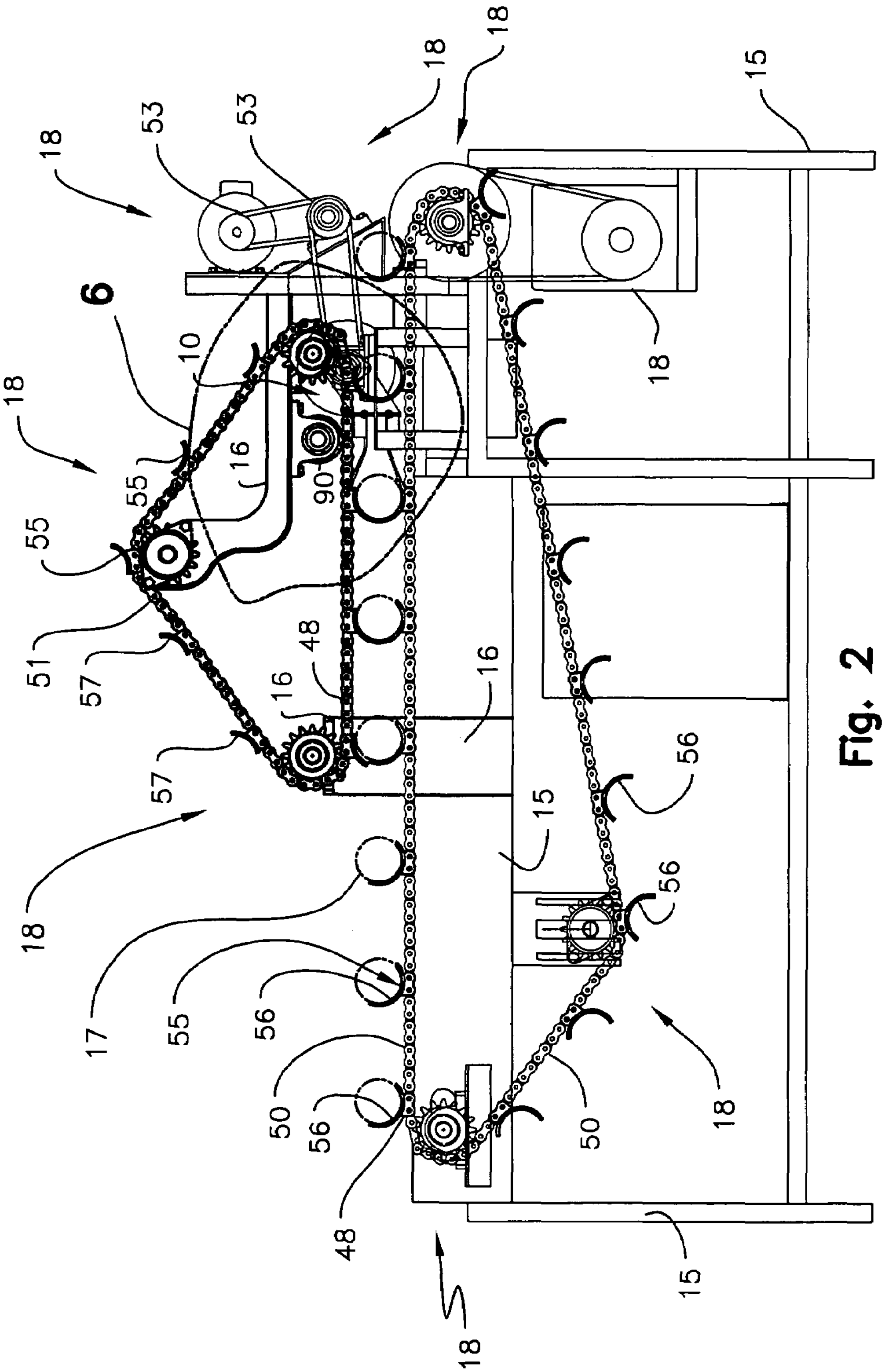
FIG. 2 illustrates the Vegetable Delivery Device (1) supported by frame means (14) comprising a bottom frame means (15), a top frame means (16), bottom conveyance means (50) and top conveyance means (51), at least one first cup (56), at least one second cup (56), drive means (18) and a wheel or skid means (90).
Figure 3:
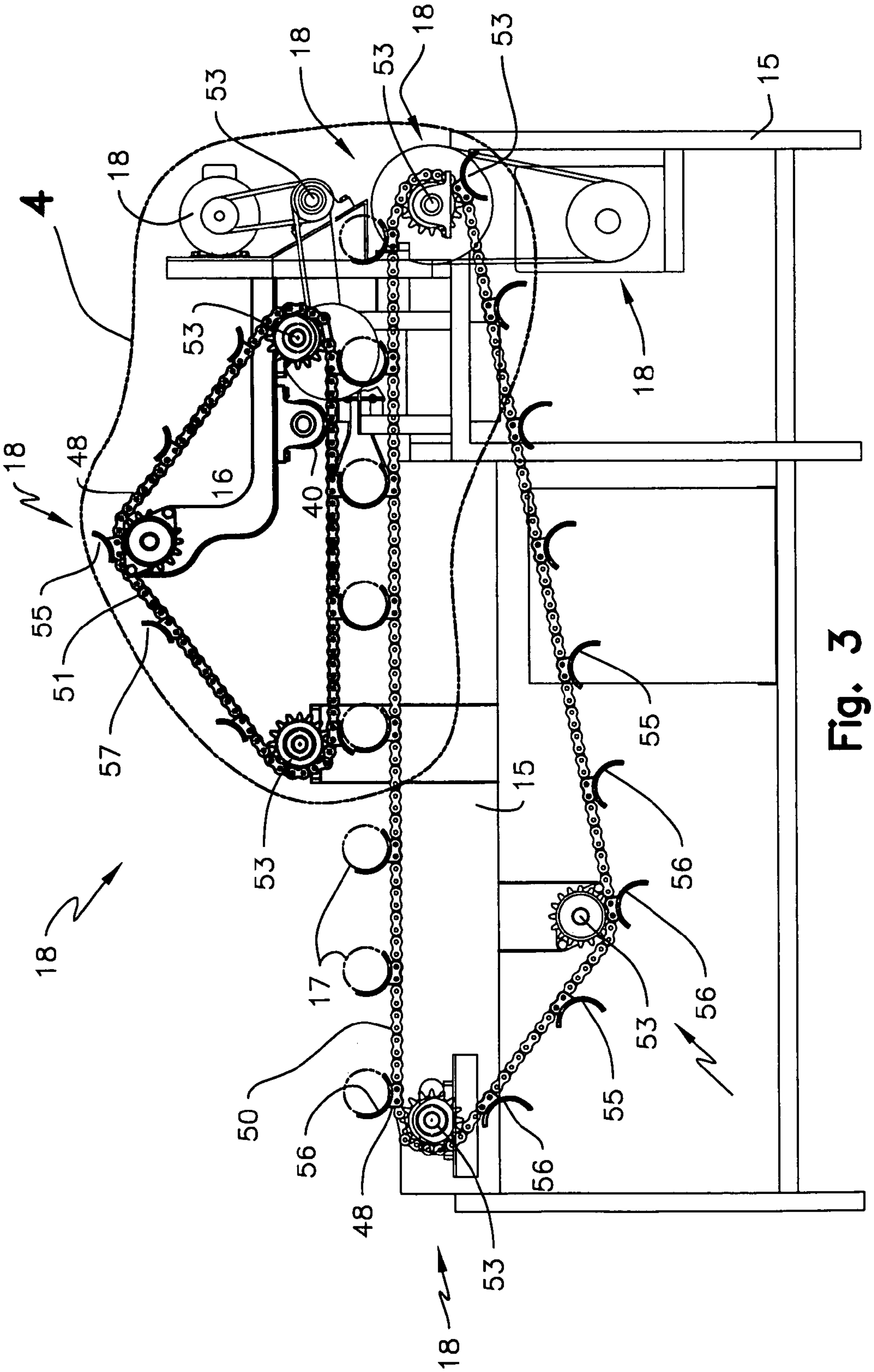
FIG. 3 is a partial section of FIG. 2 illustrating the Vegetable Delivery Device (1), frame means (14) comprising a bottom frame means (15) and a top frame means (16), bottom conveyance means (50) and top conveyance means (51), at least one first cup (56), at least one second cup (56), drive means (18) and a wheel or skid means (90).
Figure 4:
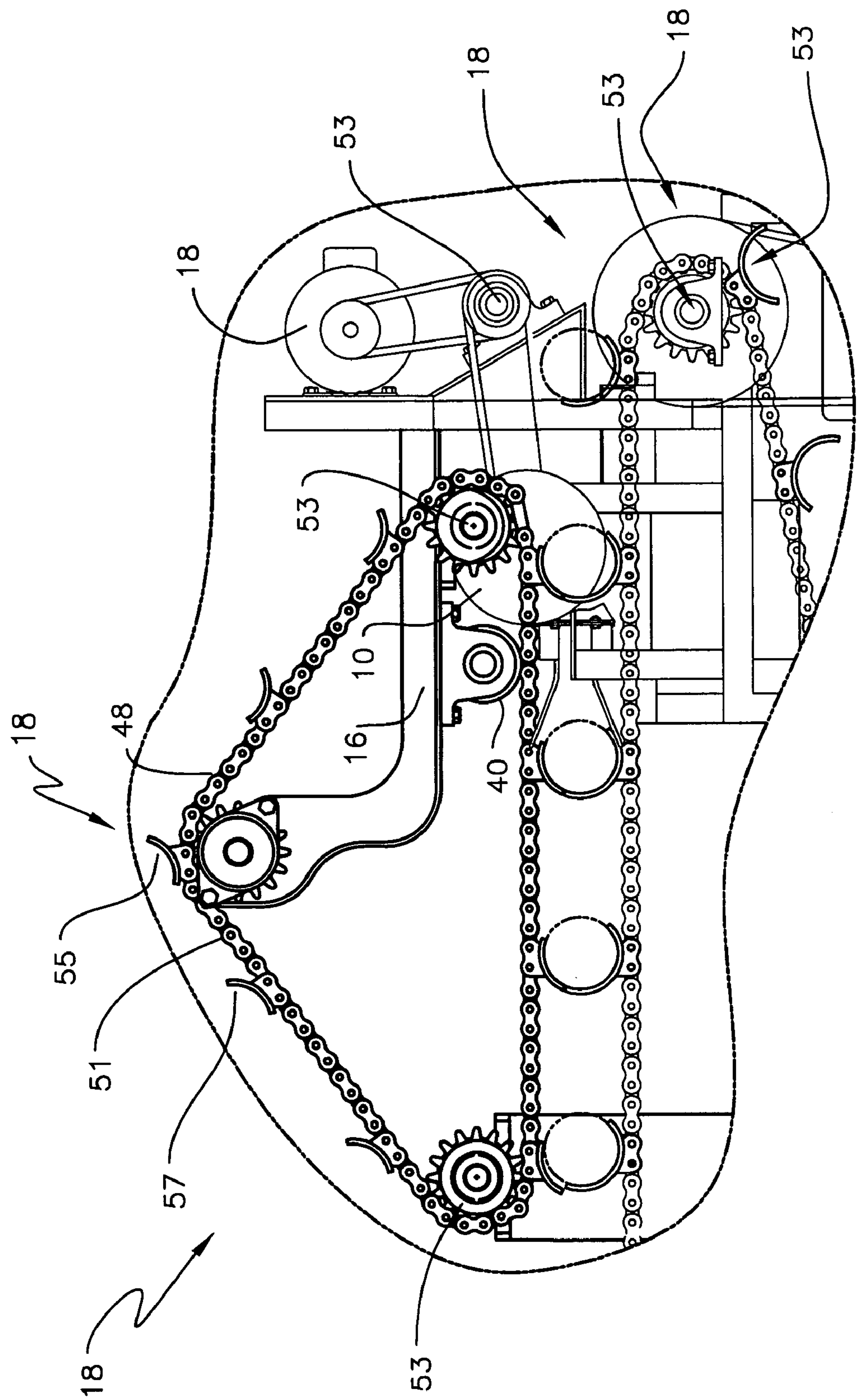
FIG. 4 is a detail from FIG. 3 illustrating the Vegetable Delivery Device (1). Shown is drive means (18) and synchronizing means (53).
Figure 5:
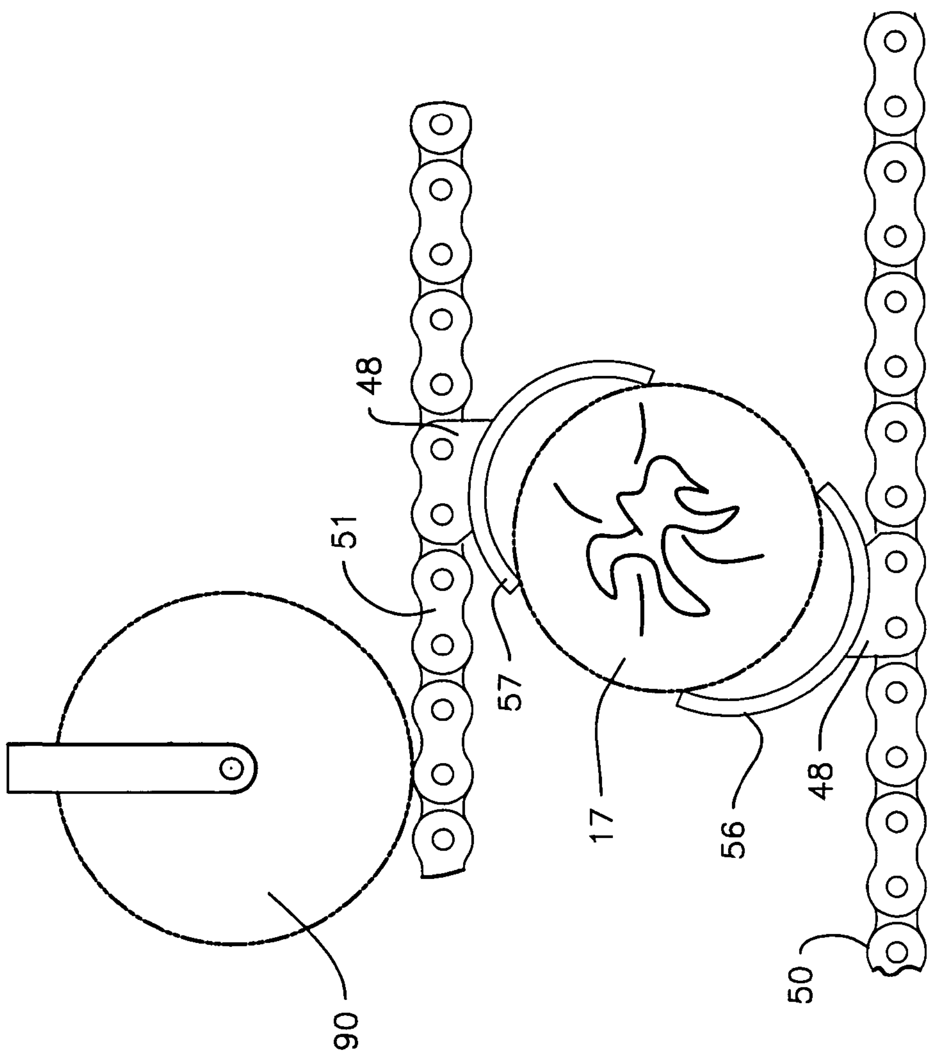
FIG. 5 is a detail from FIG. 4 illustrating the bottom and top conveyor means (50), (51), the at least one first cup (56), the at least one second cup (57) and the wheel or skid means (90).
Figure 6:
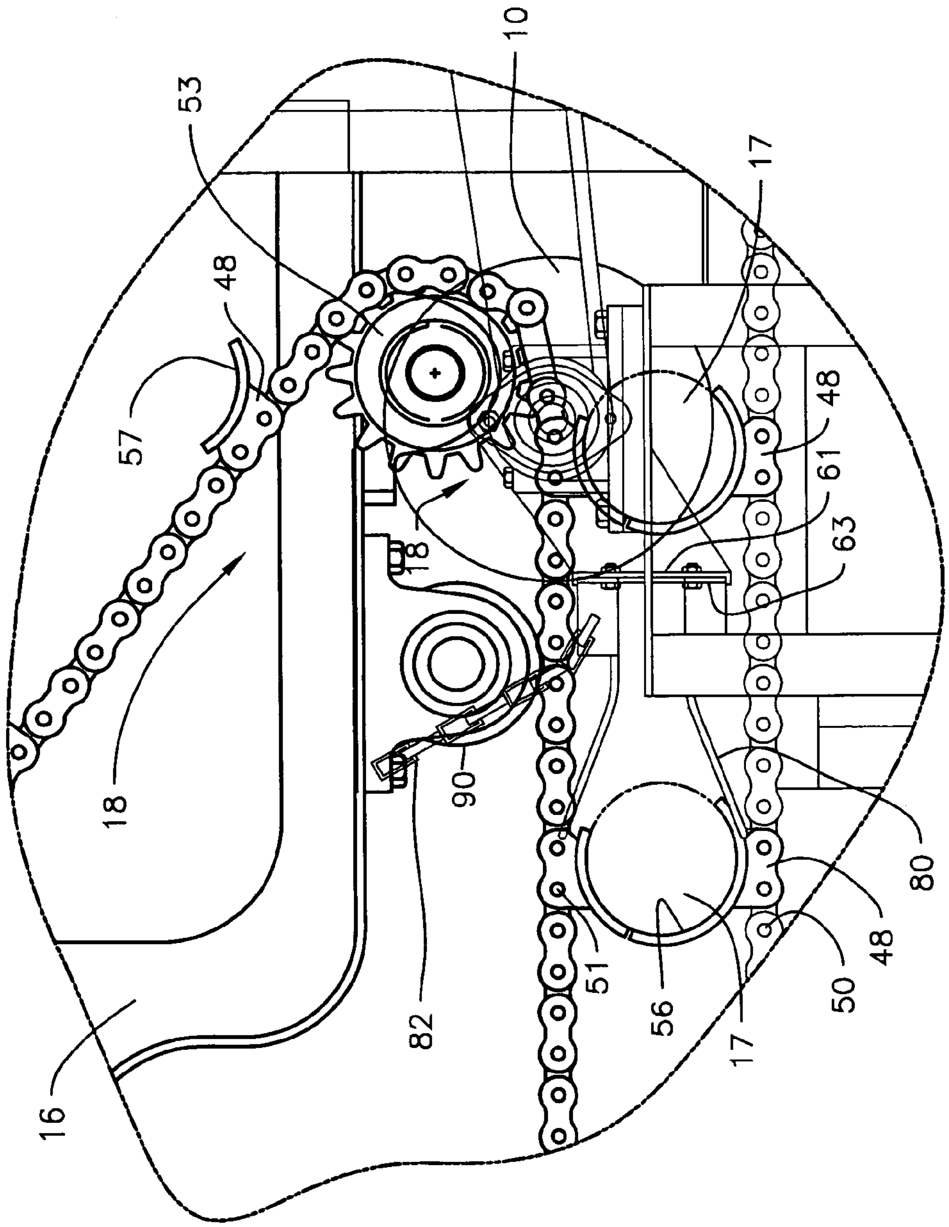
FIG. 6 is a detail from FIG. 2 illustrating the bottom conveyor means (50), top conveyance means (51), at least one first cup (56), at least one second cup (57), gear and chain means (50), (51), synchronizing means (53) and wheel or skid means (90).
Figure 7:
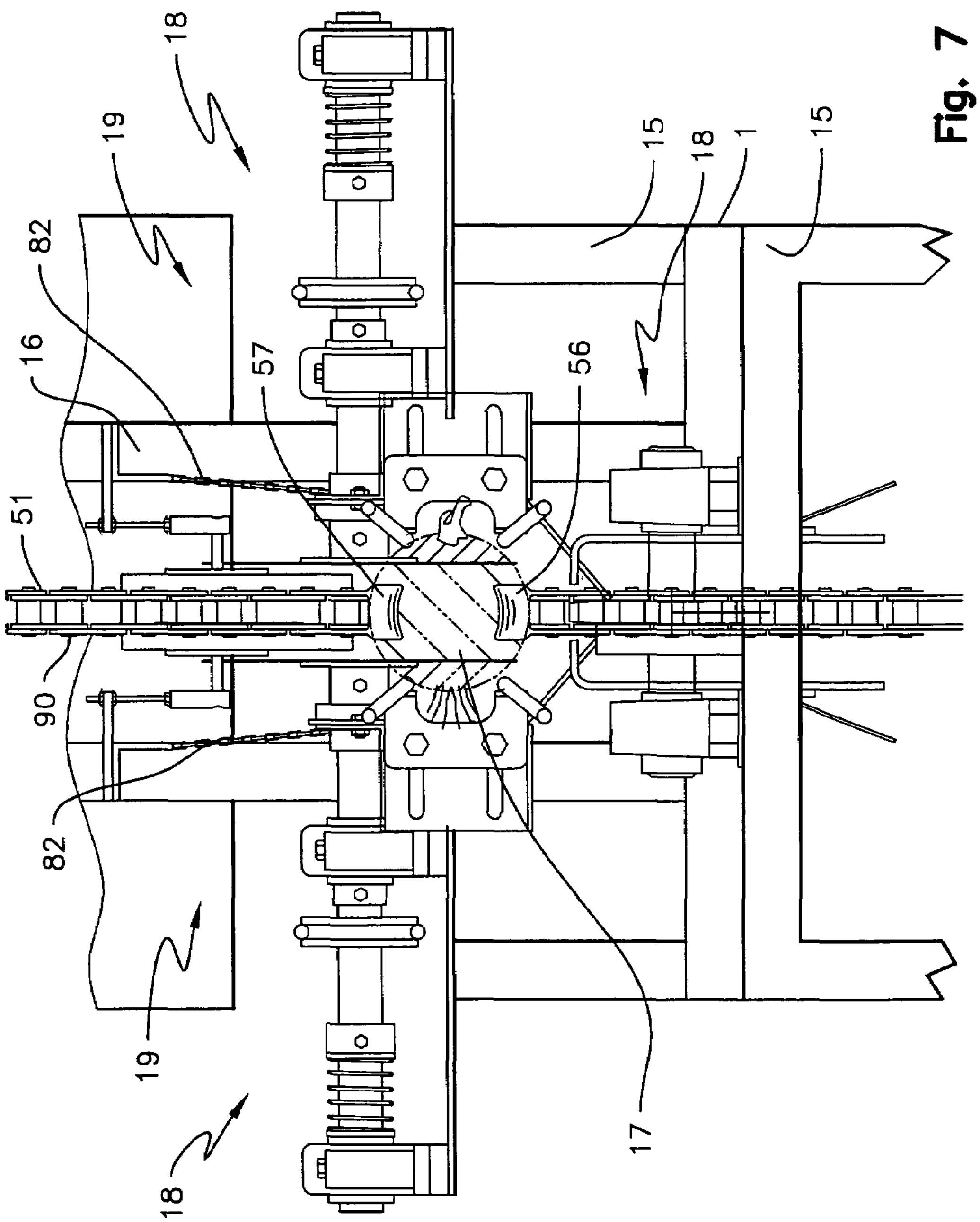
FIG. 7 illustrates the object (17) secured by the at least one first cup (56) and the at least one second cup (57), the bottom conveyor means (50) and top conveyor means (57) and the wheel or skid means (90). Also represented generally is drive means (18) comprising belts, pulleys, gears and motors.

FIGS. 1, 2 and 3 illustrate a Vegetable Delivery Device (1) showing frame means (14) comprising a bottom frame means (15) and a top frame means (16); frame means (14) comprises mounting structure to support the bottom conveyance means (50) and top conveyance means (51), drive means (18) and synchronizing means (53) with cutting means (10). At least one first cup (56) and at least one second cup (57 are affixed respectively, by cup affixing means (48), to the bottom conveyance means (50) and the top conveyance means (51). The bottom conveyance means (50) and the top conveyance means (51), in the preferred embodiment, are continuous chair and gear or belt and gear or pulley conveyance means (50), (51) and are rotatably affixed by frame affixing means (60) to the bottom frame means (15)

and the top conveyance means (51). Frame affixing means (60) includes but is not limited to bolts and welding and bearing and shafts.

As seen in FIGS. 1, 2, 3, 4 and 6, the bottom conveyance means (50) and the top conveyance means (51) are oriented and move relative to each other such that the at least one first cup (56) is positioned to receive a bulb (17) and, thereafter move in concert toward cutting means (10) as the at least one second cup (57) is moved in synchrony to secure the bulb (17) in accord with the at least one first cup (57) and the at least one second cup (57) receive and securely hold a bulb or object (17) to encounter and pass cutting means (10). Cutting means (10) as illustrated by not claimed herein include at least one circular knife (10) and, as seen in the illustrations, at least two circular knives (10).

The bottom conveyance means (50) and the top conveyance means (51) are synchronized by bottom conveyance means (50) and top conveyance synchronizing means (53) which is provided, in the preferred embodiment by, chain and gear synchronous drives of the bottom conveyance means (50) and the top conveyance means (51). Those of ordinary skill in the art will recognize belt and pulley or gear and gear and chain synchrony via interrelated drive means (18).

Synchronization means (53) will insure that the at least one first cup (56) and the at least one second cup (57) are proximal and face the other as the bottom conveyance means (50) and the top conveyance means (51) move the respective at least one first cup (56) and the at least one second cup (57) to and past the cutting means (10). Drive means (18), comprised in the preferred embodiment of a motor and belt system, synchronously rotate the said bottom conveyance means (50) and the said top conveyance means (51).

In the preferred embodiment each of the at least one first cup (56) and the at least one second cup (57) have a concave portion (55) to give greater securing forces for the stabilizing of the object (17) grasped by the respective at least one first cup (56) and the at least one second cup (57).

In the preferred embodiment the bottom conveyance means (50) is rotatably affixed by frame affixing means (60) to the bottom frame means (15) and the top conveyance means (51) is rotatably affixed by frame affixing means (60) to the top frame means (16). The bottom conveyance means (50) and the top conveyance means are synchronized such that the concave portion of the at least one first cup (56) and the concave portion of the at least one second cup (57) are proximal and face the other as the bottom conveyance means (50) and the top conveyance means (51) move the respective at least one first cup (56) and the at least one second cup (57) to and past the cutting means (10). The bottom conveyance means (50) and the top conveyance means (51) diverge after the at least one first cup (56) and the at least one second cup (57) pass the cutting means (10) thereby allowing the now process, cut or trimmed object (17) to be discharged into storage, a container or conveyor and on to additional processing.

Both of the least one first cup (56) and the at least one second cup (57) have a concave portion (55) to receive objects (17). The continuous bottom conveyance means (50) and top conveyance means (51), in the preferred embodiment, are comprised of chains and gears and or belts with gears or pulley drive means (18). In the preferred embodiment the bottom conveyance means (50) is rotatably affixed by frame affixing means (60) to the bottom frame means (15); the top conveyance means (51) is rotatably affixed by frame affixing means (60) to the top frame means (16). Drive means (18), comprised of one or more motors gear means or pulley means is interconnected to drive the chains and or belts, comprising the continuous bottom conveyance means (50) and the top conveyance means (51) and the cutting means (10). The bottom conveyance means (50) and the top conveyance means (51) are synchronized such that the concave portion of the at least one first cup (56) and the concave portion of the at least one second cup (57) are proximal and face the other as the bottom conveyance means (50) and the top conveyance means (51) move the respective at least one first cup (56) and the at least one second cup (57) to and past the cutting means (10).

In the preferred embodiment the concave portion (55) comprises a segment of a sphere and, as seen in FIGS. 2 through 7, generally a segment of a hemisphere. Operation of the disclosed device is such that the continuous bottom conveyance means (50), at the bottom frame means (15), presents the at least one first cup (56) to receive a bulb or object (17) while the continuous top conveyance means (51) and the synchronized at least one second cup (57) is distal from the at least one first cup (56). The at least one first cup (56) and the at least one second cup (57) are comprised of a rigid, semi-rigid or flexible material. In the preferred embodiment the at least one first cup (56) and the at least one second cup (57) are fabricated from stainless steel. In an alternative embodiment a flexible material may cover the concave portion (55) for added insurance against bruising of the object (17).

The at least top conveyance means (51) and the at least one second cup (57) is proximal to and provides gravity forces to secure a bulb or object (17) as the at least one first cup (56) and the at least one second cup (57) approach and pass the cutting means (10). A wheel or skid means (90) exerts a downward pinching force on the top conveyance means (51) and the at least one second cup (57) as the at least one first cup (56) and the at least one second cup (57) approach and pass the cutting means (10) to insure that the bulb or object (17) does not move during the cutting process.

In the preferred embodiment the at least one first cup (56) comprised of a plurality of first cups (56) and the at least one second cup (57) is comprised of a plurality of second cups (57). The wheel or skid means (90) downwardly bears on the top conveyance means (51) proximal the cutting means (10) such that synchronized plurality of first cups (56) and plurality of second cups (57) are pressed toward one another to secure the contained object (17). The wheel or skid means (90) in the preferred embodiment is comprised of a wheel composed of a semi-rigid or flexible material, generally a foam or plastic material, but may be a rigid material composed, for example, of stainless steel.

In the preferred embodiment, the bottom and top conveyor means (50), (51), drive means (18) and synchronizing means (53) may further comprise a chains, gears, belts, pulleys, motors and suitable shafts, bearings and bearing blocks and bracket for positioning and adjusting the tolerances of the said components of the invention. Such is generally illustrated in FIGS. 1, 2, 3, 4, 6 and 7.

In operation, a bulb (17) such as an onion may be supported on the at least one first cup (56), the root and stems extending outwardly and generally orthogonal to the frame means (14). As the bulb (17), contained in the at least one first cup (56) approached the cutting means (10), the synchronized at least one second cup (57) contacts and secures the bulb (17). The respective at least one first cup (56) and at least one second cup (57) move to place the bulb (17) into contact with the cutting means. After the cutting means (10) have cut the bulb (17) the respective bottom conveyance means (50) and top conveyance means (51)

diverge and the trimmed bulb (17) is discharged to processing. Where a plurality of at least one first cups (56) and a plurality of at least one second cups (57) are employed, the invention will further comprise a flow of bulbs in a linear arrangement, the root and stem of each bulb positioned in substantially parallel relation to each root and stem of each adjacent bulb; and simultaneously removing, in succeeding order, a substantially equal portion from each of the root and stem areas of each bulb.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A cutting apparatus comprising:

a. a frame means (14) comprising a bottom frame means (15) and a top frame means (16); at least one first cup (56) and at least one second cup (57); the at least one first cup (56) affixed by cup affixing means (48) to a bottom conveyance means (50); the at least one second cup (57) affixed by cup affixing means (48) to a top conveyance means (51); the bottom conveyance means (50) rotatably affixed by frame affixing means (60) to the bottom frame means (15); the top conveyance means (51) rotatably affixed by frame affixing means (60) to the top frame means (16);

b. the bottom conveyance means (50) and the top conveyance means (51) are oriented and move relative to each other such that the at least one first cup (56) and the at least one second cup (57) receive and securely hold a bulb or object (17) to encounter and pass cutting means (10);

c. the bottom conveyance means (50) and the top conveyance means (51) are synchronized by bottom conveyance means (50) and top conveyance synchronizing means (53), such that the at least one first cup (56) and the at least one second cup (57) are proximal and face the other as the bottom conveyance means (50) and the top conveyance means (51) move the respective at least one first cup (56) and the at least one second cup (57) to and past the cutting means (10);

d. drive means (18) rotate the said bottom conveyance means (50) and the said top conveyance means (51);

e. at least one first cup (56) having a concave portion (55) and the at least one second cup (57) having a concave portion (55);

f. the bottom conveyance means (50) and top conveyance means (51) are continuous;

g. the bottom conveyance means (50) rotatably affixed by frame affixing means (60) to a bottom frame means (15); the top conveyance means (51) rotatably affixed by frame affixing means (60) to a top frame means (16);

h. the bottom conveyance means (50) and the top conveyance means are synchronized such that the concave portion of the at least one first cup (56) and the concave portion of the at least one second cup (57) are proximal and face the other as the bottom conveyance means (50) and the top conveyance means (51) move the respective at least one first cup (56) and the at least one second cup (57) to and past the cutting means (10);

i. the bottom conveyance means (50) and the top conveyance means (51) diverge after the at least one first cup (56) and the at least one second cup (57) pass the cutting means (10);

j. at least one first cup (56) having a concave portion (55) and the at least one second cup (57) having a concave portion (55);

k. the continuous bottom conveyance means (50) and top conveyance means (51) are comprised of chains and or belts;

l. the bottom conveyance means (50) rotatably affixed by frame affixing means (60) to a bottom frame means (15); the top conveyance means (51) rotatably affixed by frame affixing means (60) to a top frame means (16); drive means (18) comprised of one or more motors gear means or pulley means interconnected to drive the chains and or belts, comprising the continuous bottom conveyance means (50) and the top conveyance means (51), the cutting means (10);

m. the bottom conveyance means (50) and the top conveyance means (51) are synchronized such that the concave portion of the at least one first cup (56) and the concave portion of the at least one second cup (57) are proximal and face the other as the bottom conveyance means (50) and the top conveyance means (51) move the respective at least one first cup (56) and the at least one second cup (57) to and past the cutting means (10);

n. the concave portion (55) comprised of a segment of a sphere;

o. the continuous bottom conveyance means (50) at the bottom frame means (15) presents the at least one first cup (56) to receive a bulb or object (17) while the continuous top conveyance means (51) and the synchronized at least one second cup (57) is distal from the at least one first cup (56);

p. the at least one first cup (56) and the at least one second cup (57) are comprised of a rigid, semi-rigid or flexible material;

q. the at least top conveyance means (51) and the at least one second cup (57) is proximal to and provides gravity forces to secure a bulb or object (17) as the at least one first cup (56) and the at least one second cup (57) approach and pass the cutting means (10);

r. a wheel means (90) exerts a downward pinching force on the top conveyance means (51) and the at least one second cup (57) as the at least one first cup (56) and the at least one second cup (57) approach and pass the cutting means (10) to insure that the bulb or object (17) does not move during the cutting process.

2. A cutting apparatus of claim 1 further comprising:

a. the concave portion (55) comprised of a segment of a hemisphere b. the at least one first cup (56) comprised of a plurality of first cups (56); the at least one second cup (57) comprised of a plurality of second cups (57);

c. wheel or skid means (90) downwardly bearing on the top conveyance means (51) proximal the cutting means (10) such that synchronized plurality of first cups (56) and plurality of second cups (57) are pressed toward one another to secure the contained object (17).

* * * * *